(12) United States Patent
Hasegawa et al.

(10) Patent No.: US 9,569,355 B2
(45) Date of Patent: Feb. 14, 2017

(54) MEMORY SYSTEM AND CONTROL METHOD

(71) Applicant: Kabushiki Kaisha Toshiba, Minato-ku (JP)

(72) Inventors: Yohei Hasegawa, Kawasaki (JP); Shigehiro Asano, Yokosuka (JP); Tokumasa Hara, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 28 days.

(21) Appl. No.: 14/459,584

(22) Filed: Aug. 14, 2014

(65) Prior Publication Data

US 2015/0052417 A1    Feb. 19, 2015

(30) Foreign Application Priority Data

Aug. 19, 2013  (JP) ................................ 2013-169880

(51) Int. Cl.
| | | |
|---|---|---|
| *G06F 11/00* | (2006.01) | |
| *G06F 12/02* | (2006.01) | |
| *G06F 11/10* | (2006.01) | |

(52) U.S. Cl.
CPC ....... *G06F 12/0246* (2013.01); *G06F 11/1012* (2013.01); *G06F 2212/1016* (2013.01); *G06F 2212/1036* (2013.01); *G06F 2212/7207* (2013.01)

(58) Field of Classification Search
CPC .............. G06F 12/0246; G06F 11/1012; G06F 2212/1016; G06F 2212/1036; G06F 2212/7207

See application file for complete search history.

(56) References Cited

U.S. PATENT DOCUMENTS

| | | | | |
|---|---|---|---|---|
| 6,385,736 B1 * | 5/2002 | Jeong | ................ | G11B 20/1883 |
| | | | | 714/48 |
| 6,813,678 B1 * | 11/2004 | Sinclair | ................ | G06F 3/0626 |
| | | | | 711/103 |
| 7,633,800 B2 * | 12/2009 | Adusumilli | .......... | G11C 29/846 |
| | | | | 365/185.09 |
| 8,055,957 B2 * | 11/2011 | Kondo | ................ | G06F 11/1068 |
| | | | | 365/185.09 |

(Continued)

FOREIGN PATENT DOCUMENTS

| | | | |
|---|---|---|---|
| JP | 2002-150789 A | 5/2002 | |
| JP | 2003-123500 A | 4/2003 | |

(Continued)

*Primary Examiner* — Esaw Abraham
(74) *Attorney, Agent, or Firm* — Oblon, McClelland, Maier & Neustadt, L.L.P.

(57) ABSTRACT

According to an embodiment, a memory system includes multiple nonvolatile memories to/from each of which data can be written/read independently of one another; and a controller configured to control writing of data to and reading of data from the nonvolatile memories. Each of the nonvolatile memories includes a data storage including a normal data storage area for storing the data and a redundant data storage area for writing the data avoiding defect positions in the normal data storage area; and a defect information storage configured to store defect information indicating information on a defect of the data storage included in another nonvolatile memory different from the present nonvolatile memory.

11 Claims, 13 Drawing Sheets

(56) References Cited

U.S. PATENT DOCUMENTS

| | | | |
|---|---|---|---|
| 8,120,957 B2* | 2/2012 | Tokiwa | G11C 16/06 365/185.09 |
| 8,423,819 B2* | 4/2013 | Yeh | G11C 29/76 714/6.1 |
| 8,576,638 B2* | 11/2013 | Kim | G11C 29/846 365/185.33 |
| 8,631,191 B2 | 1/2014 | Hashimoto | |
| 8,667,216 B2 | 3/2014 | Hashimoto | |
| 8,683,117 B2 | 3/2014 | Hashimoto | |
| 8,694,855 B1* | 4/2014 | Micheloni | G06F 11/1048 714/704 |
| 9,048,876 B2* | 6/2015 | Frayer | 714/763 |

FOREIGN PATENT DOCUMENTS

| | | |
|---|---|---|
| JP | 2009-531797 A | 9/2009 |
| JP | 2012-198869 A | 10/2012 |

* cited by examiner

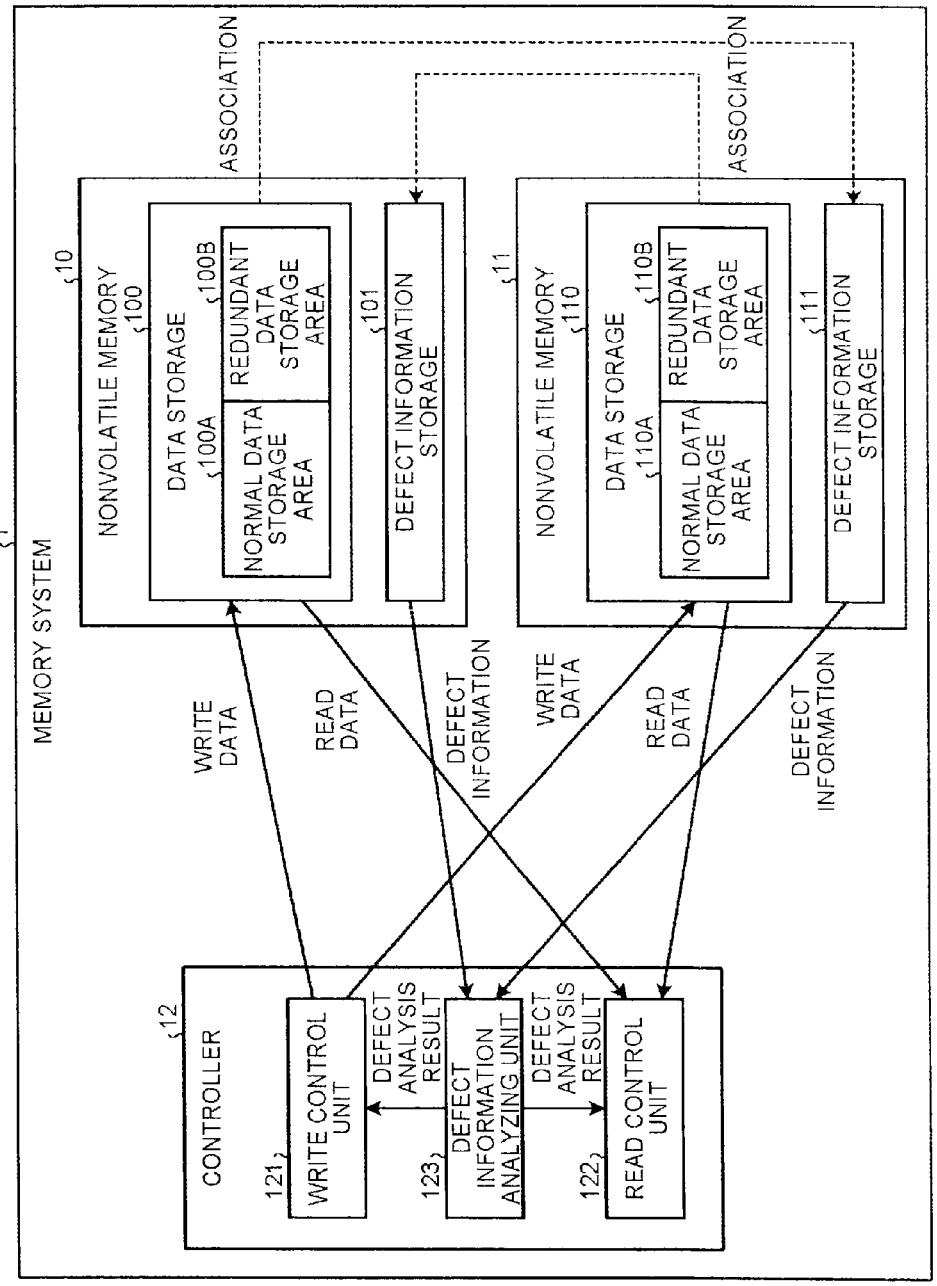

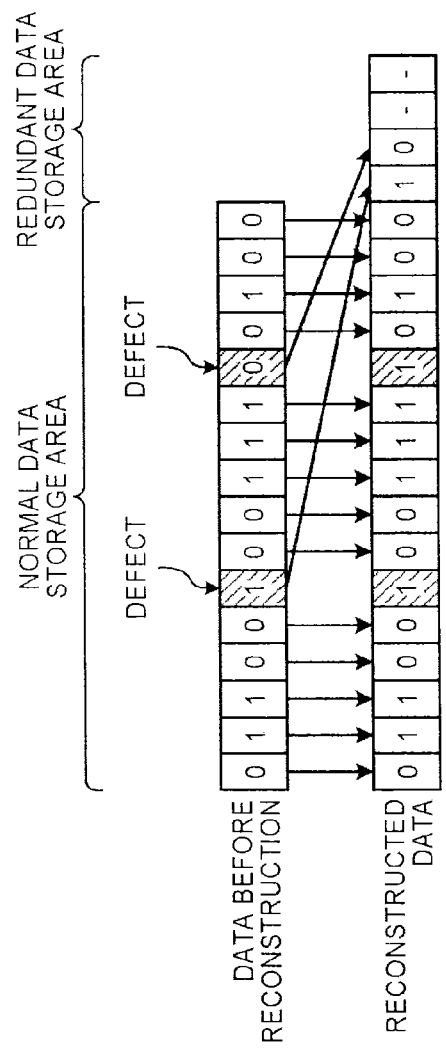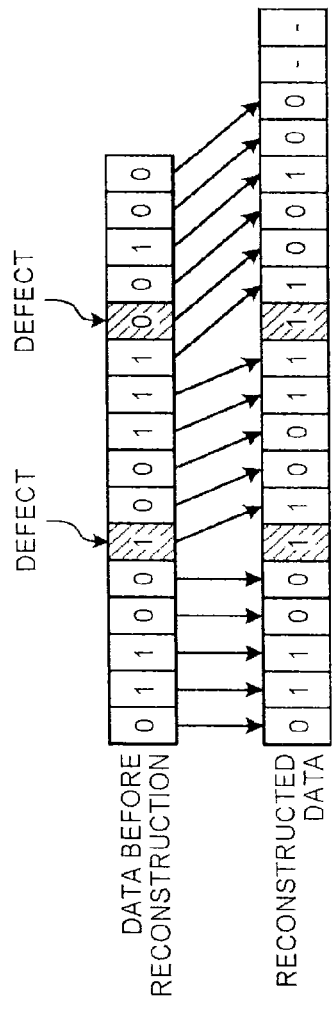

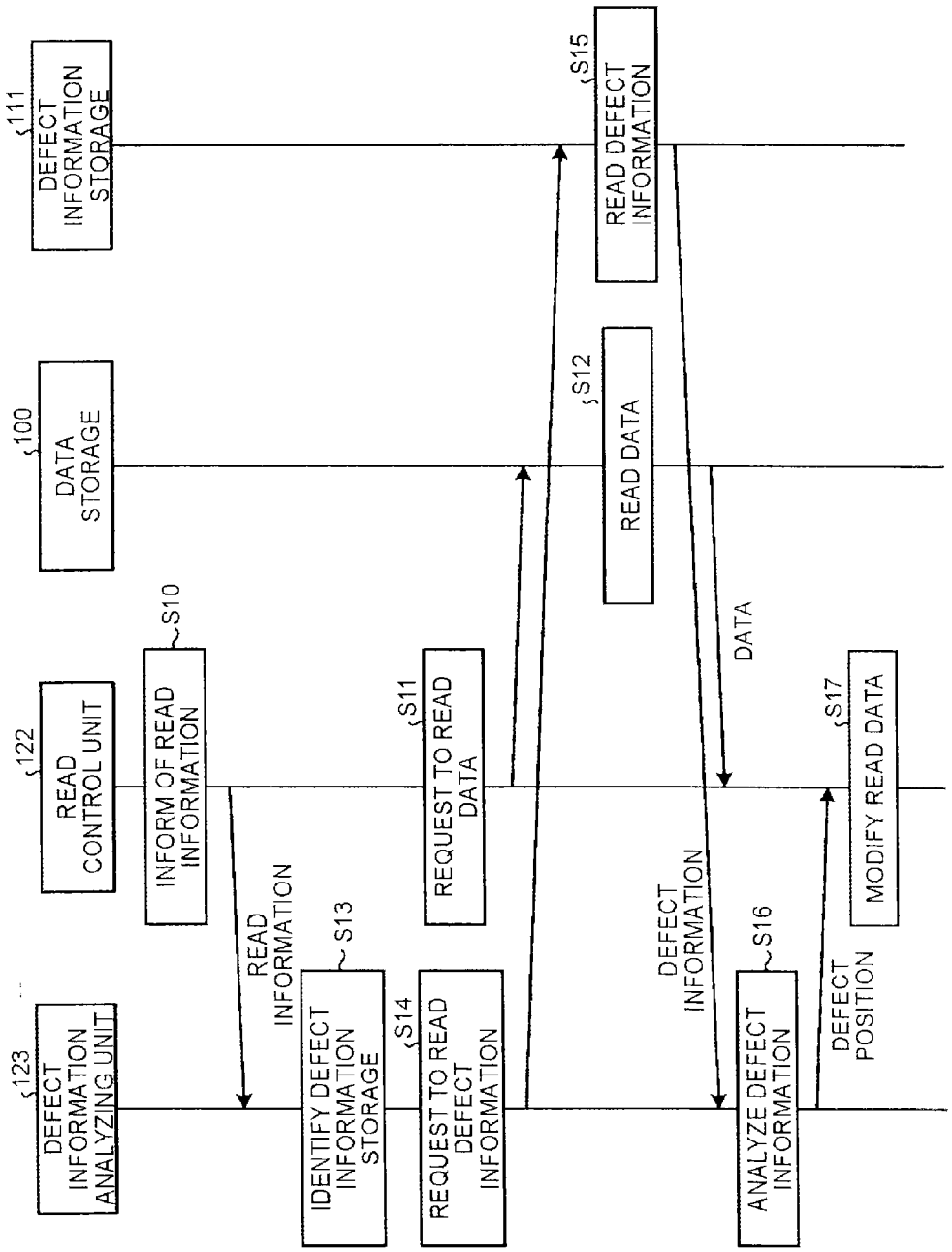

MEMORY SYSTEM AND CONTROL METHOD

CROSS-REFERENCE TO RELATED APPLICATIONS

This application is based upon and claims the benefit of priority from Japanese Patent Application No. 2013-169880, filed on Aug. 19, 2013; the entire contents of which are incorporated herein by reference.

FIELD

Embodiments described herein relate generally to a memory system and a control method.

BACKGROUND

In nonvolatile storage media such as NAND flash memory, blocks that are units of storage may become unable to be used as storage areas owing to such a reason as many errors. Such blocks that are unable to be used are called bad blocks or defective blocks, and controlled to be excluded from blocks (free blocks) in which data are to be stored.

In related art, a method of recording information indicating the positions or the like of blocks (bad blocks) in which errors are found during an inspection process in manufacturing in the form of defect information table (bad block statistical information) so that the blocks are not handled as free blocks that can be used is known. The defect information table is recorded on a nonvolatile storage medium and expanded into a volatile storage medium (such as a RAM) at system start-up for use.

The units of managing the defect information table are units of storage (such as units of blocks) in a nonvolatile storage medium, and the defect information table assumed to be entirely expanded into a volatile storage medium at start-up for use. In a case of a storage medium with a higher percent defective, however, more granular defect avoidance control in units of bits, for example, is required. In this case, however, the defect information table has a large size and cannot be expanded into a volatile storage medium such as a DRAM at a time. Thus, the defect information table stored in the nonvolatile storage medium needs to be referred to each time data are written/read thereinto/therefrom and the time for reading the defect information table from the nonvolatile storage medium is an overhead.

BRIEF DESCRIPTION OF THE DRAWINGS

FIG. 1 is a diagram illustrating an exemplary configuration of a memory system according to a first embodiment;

FIGS. 5A and 5B are diagrams illustrating examples of reconstruction of data to be written according to the first embodiment;

FIG. 6 is a chart illustrating an example of read control according to the first embodiment;

DETAILED DESCRIPTION

Figure 2A:
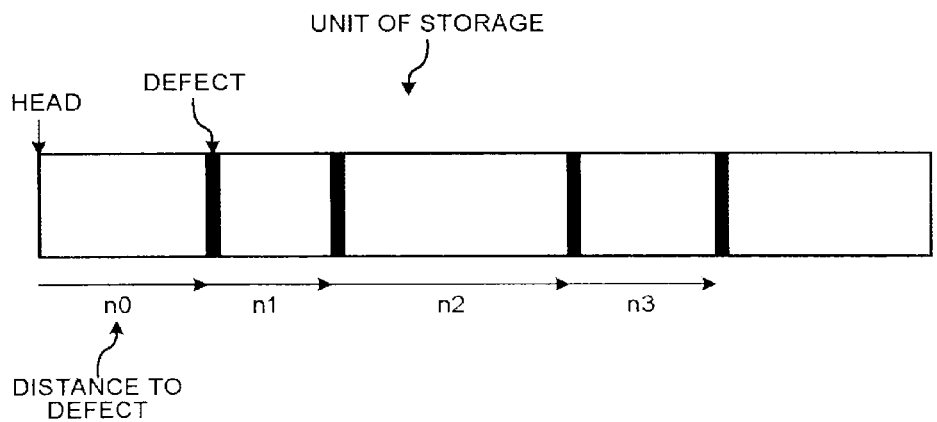
FIGS. 2A and 2B are diagrams illustrating an example of defect information according to the first embodiment.

According to an embodiment, a memory system includes multiple nonvolatile memories to/from each of which data can be written/read independently of one another; and a controller configured to control writing of data to and reading of data from the nonvolatile memories. Each of the nonvolatile memories includes a data storage including a normal data storage area for storing the data and a redundant data storage area for writing the data avoiding defect positions in the normal data storage area; and a defect information storage configured to store defect information indicating information on a defect of the data storage included in another nonvolatile memory different from the present nonvolatile memory.

Embodiments will be described below in detail with reference to the accompanying drawings.

First Embodiment

FIG. 1 is a diagram illustrating an exemplary configuration of a memory system 1 according to a first embodiment. As illustrated in FIG. 1, the memory system 1 includes a first nonvolatile memory 10, a second nonvolatile memory 11, and a controller 12. The first nonvolatile memory 10 and the controller 12 are connected to each other, and the second nonvolatile memory 11 and the controller 12 are connected to each other. The first nonvolatile memory 10 and the second nonvolatile memory 11 are memories different from each other, and data are written or read independently of each other (in parallel). In this example, each of the first nonvolatile memory 10 and the second nonvolatile memory 11 can be assumed to correspond to a "nonvolatile memory" in the claims. For convenience of explanation, an example in which the number of nonvolatile memories included in the memory system 1 is two will be described here, but the number of the nonvolatile memories included in the memory system 1 is not limited thereto and may be three or more, for example.

The first nonvolatile memory 10 includes one or more data storages 100 and one or more defect information storages 101. A data storage 100 is defined for each unit of storage (such as a block or a page) of the first nonvolatile memory 10, and the number of the data storages 100 present in the first nonvolatile memory 10 is determined according to the data storage capacity of the first nonvolatile memory 10. Similarly, the second nonvolatile memory 11 includes one or more data storages 110 and one or more defect information storages 111. For convenience of explanation, an example in which the first nonvolatile memory 10 includes one data storage 100 and one defect information storage 101 and the second nonvolatile memory 11 includes one data storage 110 and one defect information storage 111 will be described here. The first nonvolatile memory 10 and the second nonvolatile memory 11, however, are not limited thereto. Note that the first nonvolatile memory 10 and the second nonvolatile memory 11 are NAND flash memories, for example, but are not limited thereto.

In the following description, the first nonvolatile memory 10 and the second nonvolatile memory 11 will be simply referred to as "nonvolatile memories" when the nonvolatile memories need not be distinguished from each other, the data storage 100 and the data storage 110 will be simply referred to as "data storages" when the data storages need not be distinguished from each other, and the defect information storage 101 and the defect information storage 111 will be simply referred to as "defect information storages" when the defect information storages need not be distinguished from each other.

As illustrated in FIG. 1, the data storage 100 included in the first nonvolatile memory 10 includes a normal data storage area 100A into which data are stored and a redundant data storage area 100B into which data are written avoiding defect positions in the normal data storage area 100A. The normal data storage area 100A can store system management information, error correction codes, and the like in addition to data to be stored in the first nonvolatile memory 10. The redundant data storage area 100B can also be used as storage location of data to be stored at defect positions in the normal data storage area 100A. Furthermore, the defect information storage 101 included in the first nonvolatile memory 10 stores defect information indicating information on defects of the data storage 110 included in the second nonvolatile memory 11.

Similarly, the data storage 110 included in the second nonvolatile memory 11 includes a normal data storage area 110A into which data are stored and a redundant data storage area 110B into which data are written avoiding defect positions in the normal data storage area 110A. Furthermore, the defect information storage 111 included in the second nonvolatile memory 11 stores defect information indicating information on defects of the data storage 100 included in the first nonvolatile memory 10.

In the following description, the normal data storage area 100A and the normal data storage area 110A will be simply referred to as "normal data storage areas" when the normal data storage areas need not be distinguished from each other, and the redundant data storage area 100B and the redundant data storage area 110B will be simply referred to as "redundant data storage areas" when the redundant data storage areas need not be distinguished from each other.

In the present embodiment, the defect information storage 111 associated with the data storage 100 included in the first nonvolatile memory 10 is provided in the second nonvolatile memory 11 that can be accessed independently of (in parallel with) the first nonvolatile memory 10, and the defect information storage 101 associated with the data storage 110 included in the second nonvolatile memory 11 is provided in the first nonvolatile memory 10 that can be accessed independently of the second nonvolatile memory 11. As a result of adopting such an arrangement, a data storage and a defect information storage associated with the data storage can be accessed in parallel and the time for reading data and the time for reading defect information can be overlapped with each other.

Note that the defect information is assumed to be information that can identify a physical defect position on a storage medium for data (an address that can identify an area in a nonvolatile memory) or the like. The defect information need not necessarily be information identifying a defect position or information identifying a physical cause of a defect, but may be control information defined to avoid writing/reading to/from a defect position. The format of the defect information is defined by a defect avoidance algorithm and is not particularly limited herein. A defect avoidance algorithm defines control to read and write data avoiding defect positions in a normal data storage area, and is realized by the controller 12, which will be described later.

Examples of the defect information will be described below. The simplest example of the defect information is a defect information map (bitmap) indicating whether or not each of predetermined unit areas is defective generated for each unit of area in each of data storages 100 and 110. This example is advantageous in that the location of defect information can be easily identified from the position where data are stored. When the defect information map is provided for each bit, for example, however, an amount of defect information maps corresponding to the amount of stored data is required, which poses a problem that the amount of defect information is large.

Figure 2B:
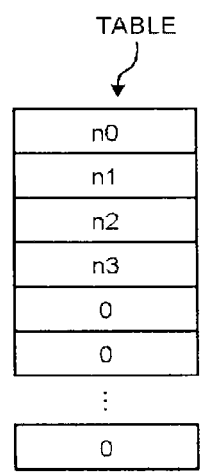

An example of defect information in which the amount of information is further reduced is thus illustrated in FIGS. 2A and 2B. FIGS. 2A and 2B illustrate a format expressing distances (n0 to n3) between defect positions as defect information for each predetermined unit of storage. The example of FIG. 2A illustrates that the first defect is present at the n0-th bit from the head of a unit of storage and that the next defect is present at the n1-th bit from the n0-th bit (the same is applicable to n2 and n3). In this example, "n0" is stored on the first line of a table storing defect information, "n1" is stored on the second line, "n2" is stored on the third line, "n3" is stored on the fourth line, and "0" is stored on the fifth and subsequent lines as illustrated in FIG. 2B. This means that the first defect is present at the n0-th bit from the head of the unit of storage, the next defect is present at the n1-th bit from the n0-th bit, the next defect is present at the n2-th bit from the n1-th bit, the next defect is present at the n3-th bit from the n2-th bit, and no defect is present in the rest. Note that it is only needed to provide an amount of information capable of expressing addresses in a unit of storage to express the defect information n0 to n3, and this can reduce the amount of information as compared to the simple defect information map. The depth of the table in which information is stored represents the number of defects that can be relieved, and may be changed according to the percent defective or target reliability.

Figure 3:
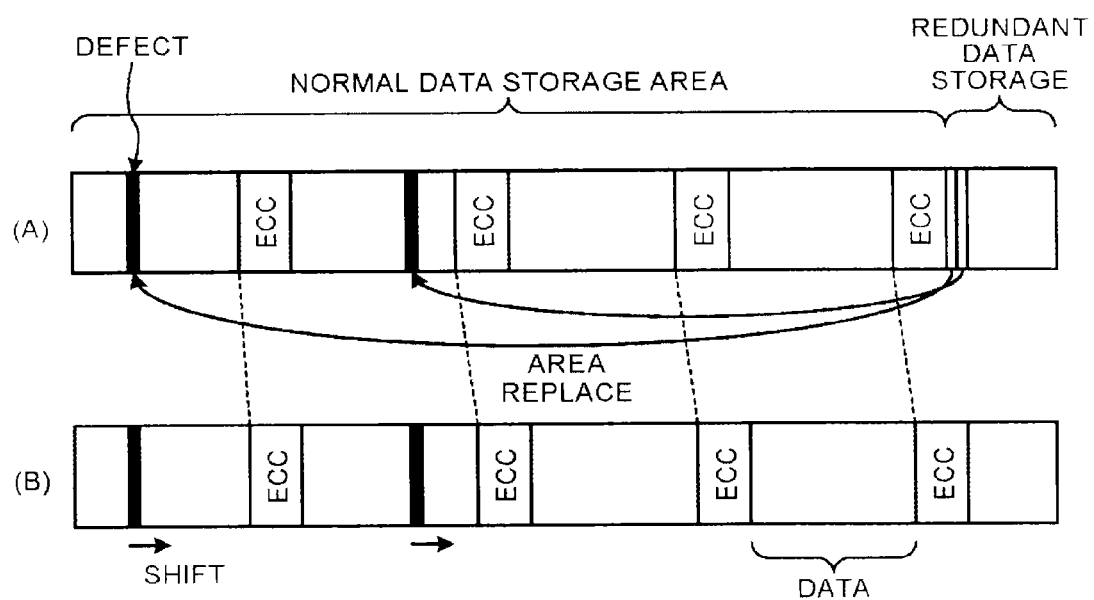
FIG. 3 is a diagram illustrating exemplary configurations of a data storage according to the first embodiment.

Next, a configuration of the data storages (100, 110) will be described. FIG. 3 is a diagram illustrating exemplary configurations of a data storage. In the example of (A) in FIG. 3, an error correction code (ECC) is added to each certain unit of data (4 KB, for example) and four units of data are stored in the normal data storage area. Data to be written to the defect position identified by the aforementioned defect information are stored in the redundant data storage area and replaced with data read from the defect positions during reading. In contrast, in the example of (B) in FIG. 3, defect positions in the normal data storage area are skipped and data are entirely shifted and stored. Then, data in excess of the range of the normal data storage area are stored in the redundant data storage area.

Referring back to FIG. 1, description will be made on a configuration of the controller 12. As illustrated in FIG. 1, the controller 12 includes a write control unit 121, a read control unit 122, and a defect information analyzing unit 123.

The write control unit 121 in receipt of a data write request from a host device, which is not illustrated, determines a data storage (100 or 110 in this example) into which data are to be written. For example, a write request contains a command requesting execution of writing, data requested to be written, and a logical address indicating the place to which the data requested to be written is assigned among virtual space addresses in a program. The logical address is specified by the host device that is not illustrated. For example, a log-structured method can be employed as a data writing method. In the log-structured method, data are erased in units of blocks and written in units of pages to an erased block. In the log-structured method, a block to which data requested to be written are written is determined independently of the logical block address assigned to the data, and the data are written in ascending order of pages.

The write control unit 121 informs the defect information analyzing unit 123 of a physical address (an example of position information indicating a position in a data storage) indicating a position in the data storage to which data are to be written. The write control unit 121 then controls writing of data to the data storage while avoiding writing of data to defect positions identified by the defect information analyzing unit 123. The method for identifying the defect positions by the defect information analyzing unit 123 will be described later.

The read control unit 122 in receipt of a data read request from a host device, which is not illustrated, performs control to read data stored in the data storage (100 or 110 in this example) requested to read data therefrom. For example, a read request contains a command requesting execution of reading, and a logical address indicating the place to which data requested to be read is assigned among virtual space addresses in a program. The logical address is specified by the host device. The read control unit 122 in receipt of a data read request from the host device refers to a logical-to-physical translation table, which is not illustrated, to identify a physical address (an example of position information indicating a position in a data storage) associated with the logical address contained in the read request. The read control unit 122 informs the defect information analyzing unit 123 of the identified address, and performs control to read data stored in the data storage identified by the identified physical address. The read control unit 122 then performs control to modify the data read from the data storage on the basis of defect positions identified by the defect information analyzing unit 123. Specific details will be described later.

The defect information analyzing unit 123 reads defect information from the defect information storage (101 or 111) associated with the data storage (100 or 110) from which data are to be read by the read control unit 122, and analyzes the defect information to locate the defect positions. The defect information analyzing unit 123 also reads defect information from the defect information storage associated with the data storage to which data are determined to be written, and analyzes the defect information to locate the defect positions.

In the present embodiment, the defect information analyzing unit 123 identifies position information (also referred to as "second position information" in the following description) indicating the position of the defect information storage associated with the data storage to/from which data are to be written/read by using a linear expression on position information (may also be referred to as "first position information" in the following description) indicating the position of the data storage. When the position information of the data storage 100 included in the first nonvolatile memory 10 is represented by M, for example, the position information N of the associated defect information storage 111 may be obtained by a calculation expression $N = \text{Offset} - M \times \alpha$ or the like (in this example, Offset and $\alpha$ are constants).

Figure 4:
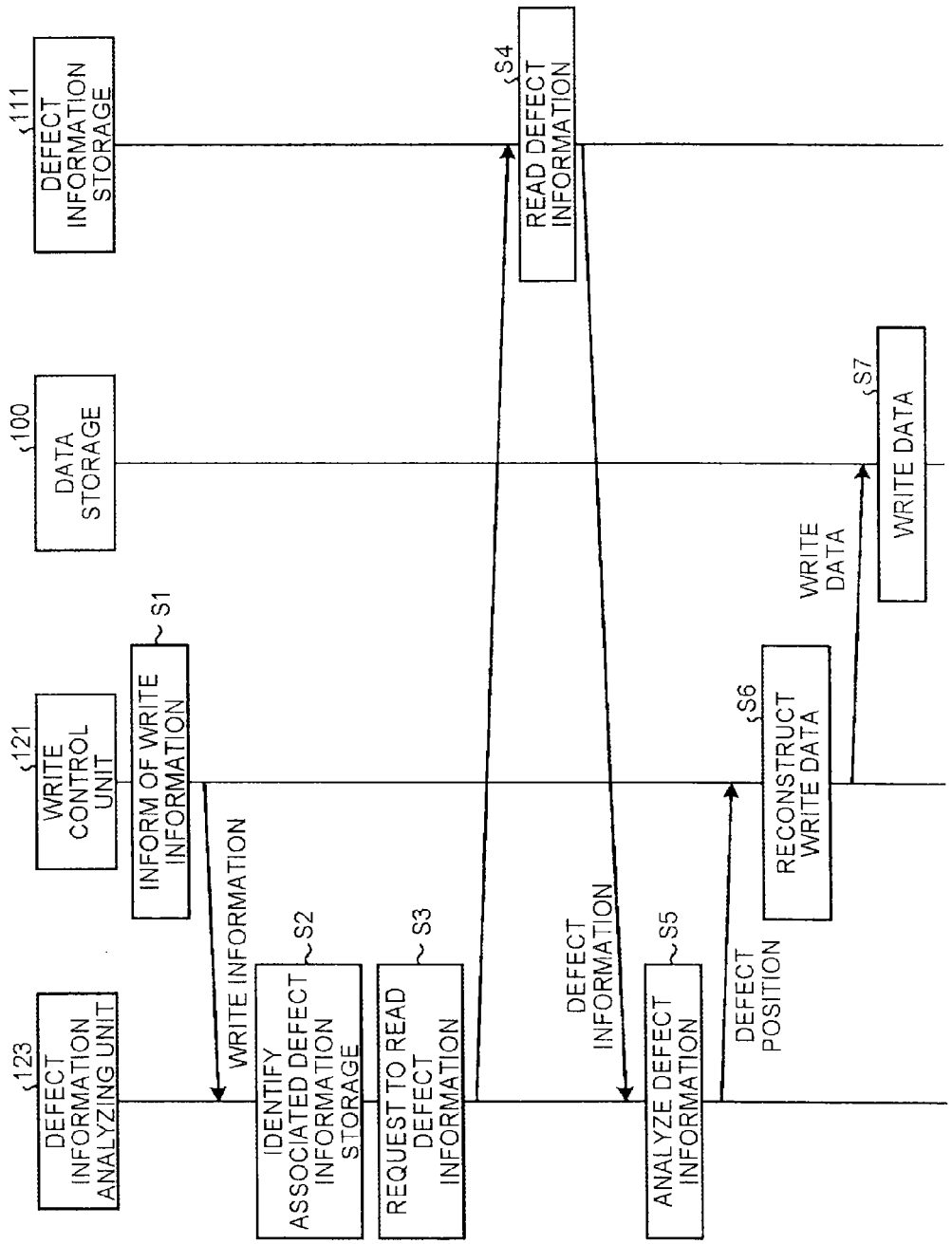
FIG. 4 is a flowchart illustrating an example of write control according to the first embodiment.

Next, control (may also referred to as "write control" in the following description) performed by the write control unit 121 will be specifically described. In the following description, data to be written may also be referred to "write data". FIG. 4 is a flowchart illustrating an example of the write control. As illustrated in FIG. 4, when data are to be written to the data storage 100, the write control unit 121 first informs the defect information analyzing unit 123 of a physical address indicating the position of the data storage 100 to which data are to be written as write information (step S1). The defect information analyzing unit 123 informed of the write information identifies the defect information storage 111 associated with the data storage 100 to which data are to be written (step S2). Subsequently, the defect information analyzing unit 123 makes a defect information read request to the defect information storage 111 to read defect information (steps S3 and S4).

Subsequently, the defect information analyzing unit 123 analyzes the defect information (step S5). The defect information analyzing unit 123 then locates defect positions in the normal data storage area 100A of the data storage 100 to which data are to be written, and informs the write control unit 121 of the located defect positions. Subsequently, the write control unit 121 avoids writing of data to the defect positions in the normal data storage area 100A on the basis of the defect positions received from the defect information analyzing unit 123, and reconstructs write data so that writing will be done by using the redundant data storage area 100B (step S6). The write control unit 121 then instructs the data storage 100 to write the reconstructed write data. The data storage 100 in receipt of the instruction writes the received write data (step S7).

Examples of the reconstruction of write data are illustrated in FIGS. 5A and 5B. FIGS. 5A and 5B illustrate examples of reconstruction of write data when two (two bits of) defects are present in the normal data storage area. FIG. 5A illustrates an example of reconstruction of write data corresponding to the exemplary configuration of the data storage illustrated in (A) in FIG. 3, and FIG. 5B illustrates an example of reconstruction of write data corresponding to the exemplary configuration of the data storage illustrated in (B) in FIG. 3.

In FIG. 5A, write data are reconstructed so that data to be written to the defect positions in the normal data storage area are sequentially written in the redundant data storage area of the same data storage. Data such as "1" that are predetermined according to the specification of the nonvolatile memory can be fixedly written to the defect positions. In contrast, in FIG. 5B, data to be written to the defect positions in the normal data storage area are shifted to the right by one bit and written to next positions. In this manner, the defect positions are avoided by shifting to the right in writing, and data in excess of the normal data storage area are written into the redundant data storage area. Both of the examples of FIGS. 5A and 5B use a redundant data storage area of two bits, and either one with a smaller implementation cost may be adopted.

Next, control (may also referred to as "read control" in the following description) performed by the read control unit 122 will be specifically described. In the following description, data to be read may also be referred to "read data". FIG. 6 is a flowchart illustrating an example of the read control. In the example of FIG. 6, a case in which data stored in the data storage 100 are to be read is assumed. The read control unit 122 in receipt of a data read request from the host device first refers to a logical-to-physical translation table, which is not illustrated, to identify a physical address associated with a logical address contained in the read request, and informs the defect information analyzing unit 123 of the identified physical address as read information (step S10). The read control unit 122 also requests the data storage 100 identified by the physical address identified in step S10 to read data (step S11). The data storage 100 in receipt of the request read data stored in the normal data storage area 100A (step S12), and informs the read control unit 122 of the read data.

In the meantime, the defect information analyzing unit 123 informed of the read information by the read control unit 122 identifies the defect information storage 111 associated with the data storage 100 from which data are to be read (step S13). Subsequently, the defect information analyzing unit 123 makes a defect information read request to the defect information storage 111 to read defect information (steps S14 and S15). Subsequently, the defect information analyzing unit 123 analyzes the defect information (step S16). The defect information analyzing unit 123 then locates defect positions in the normal data storage area 100A of the data storage 100 from which data are to be read, and informs the read control unit 122 of the located defect positions. The read control unit 122 then performs control to modify the data received (read) from the data storage 100 on the basis of defect positions received from the defect information analyzing unit 123 (step S17).

In the examples of the reconstruction of write data illustrated in FIGS. 5A and 5B, the process of modifying read data can be realized by a process reverse of the reconstruction of write data. In the example of FIG. 5A, for example, since data to be written to the defect positions are stored in the redundant data storage area, the data read from the defect positions can be replaced with data read from the redundant data storage area (an example of modification). Information indicating association between data stored in the defect positions in the normal data storage area and data stored in the redundant data storage area can be stored in a memory (which may be the first nonvolatile memory 10 or the second nonvolatile memory 11, for example, or another memory), which is not illustrated, for example. In contrast, in the example of FIG. 5, the data to be read from the defect positions can be shifted to the left by one bit and replaced by next data in the right.

As described above, in the present embodiment, the defect information storage 111 associated with the data storage 100 included in the first nonvolatile memory 10 is provided in the second nonvolatile memory 11 that can be accessed independently of (in parallel with) the first nonvolatile memory 10, and the defect information storage 101 associated with the data storage 110 included in the second nonvolatile memory 11 is provided in the first nonvolatile memory 10 that can be accessed independently of the second nonvolatile memory 11. As a result of adopting such an arrangement, a data storage and a defect information storage associated with the data storage can be accessed in parallel and the time for reading data and the time for reading defect information can be overlapped with each other. This can produce an advantageous effect that defect avoidance control can be realized without performance degradation.

Although an example in which the number of nonvolatile memories included in the memory system 1 is two is described above, the number of the nonvolatile memories included in the memory system 1 is not limited thereto and may be three or more, for example. When the memory system 1 includes a third nonvolatile memory (corresponding to a "nonvolatile memory" in the claims) in addition to the first nonvolatile memory 10 and the second nonvolatile memory 11, for example, the defect information storage 111 associated with the data storage 100 included in the first nonvolatile memory 10 may be provided in the second nonvolatile memory 11 as in the first embodiment described above or may be provided in the third nonvolatile memory unlike the first embodiment. In other words, each of the nonvolatile memories included in the memory system 1 may be in any form including a data storage and a defect information storage that stores defect information of the data storage included in another nonvolatile memory different from the nonvolatile memory.

Second Embodiment

Figure 7:
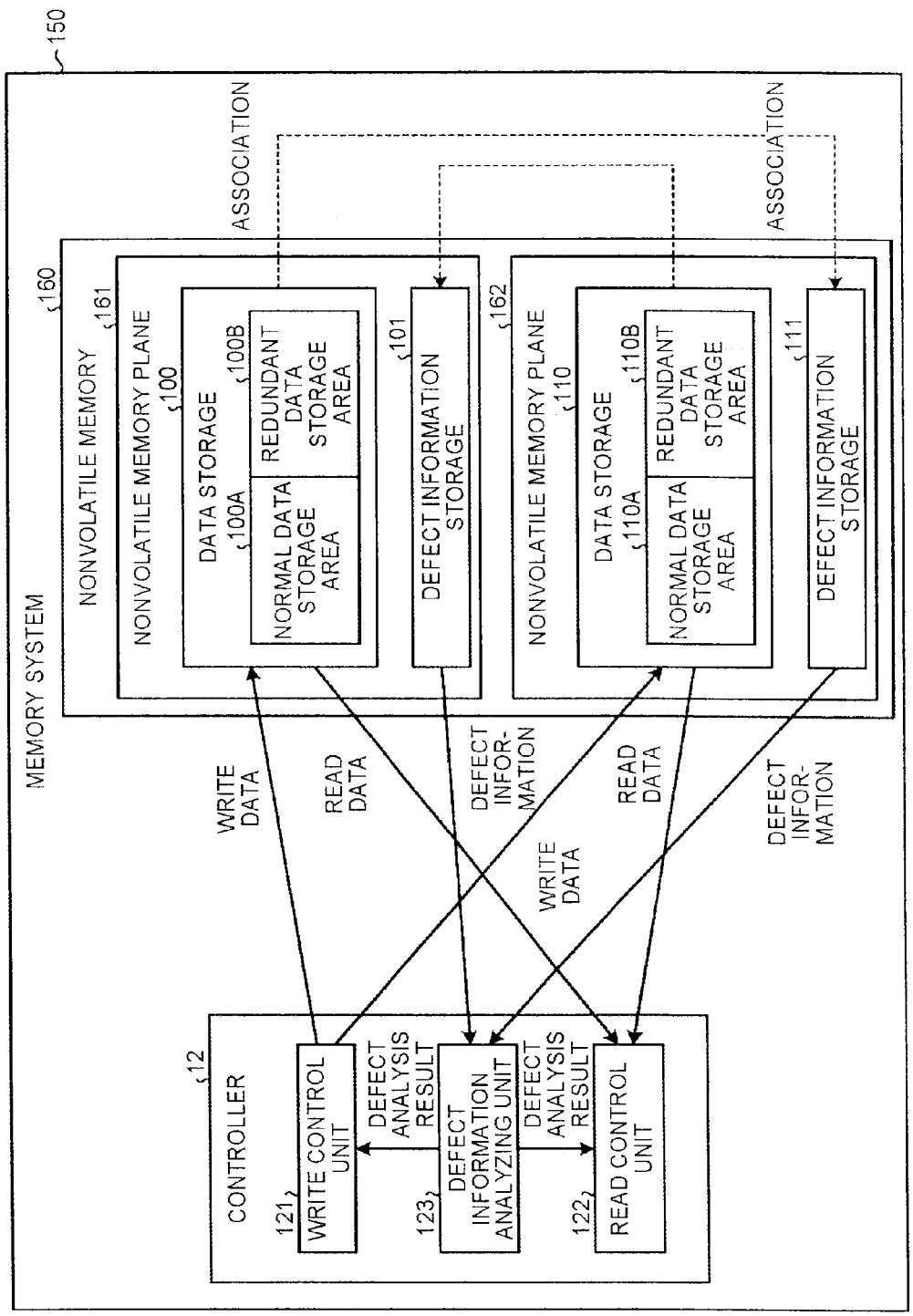
FIG. 7 is a diagram illustrating an exemplary configuration of a memory system according to a second embodiment.

Next, a second embodiment will be described. Description of parts that are the same as those in the first embodiment described above will not be repeated as appropriate. FIG. 7 is a diagram illustrating an exemplary configuration of a memory system 150 according to the second embodiment. The memory system 150 of the second embodiment includes a nonvolatile memory 160 instead of the first nonvolatile memory 10 and the second nonvolatile memory 11. The nonvolatile memory 160 includes a first nonvolatile memory plane 161 and a second nonvolatile memory plane 162 that can be accessed independently of each other.

The first nonvolatile memory plane 161 corresponds to the first nonvolatile memory 10 in the first embodiment and includes a data storage 100 and a defect information storage 101. The second nonvolatile memory plane 162 corresponds to the second nonvolatile memory 11 in the first embodiment and includes a data storage 110 and a defect information storage 111.

Similarly to the first embodiment described above, the defect information storage 111 associated with the data storage 100 included in the first nonvolatile memory plane 161 is provided in the second nonvolatile memory plane 162, and the defect information storage 101 associated with the data storage 110 included in the second nonvolatile memory plane 162 is provided in the first nonvolatile memory plane 161. As a result of adopting such an arrangement, a data storage and a defect information storage associated with the data storage can be accessed in parallel and the time for reading data and the time for reading defect information can be overlapped with each other.

Third Embodiment

Next, a third embodiment will be described. In the third embodiment, a defect information analyzing unit refers to association information indicating association of position information (first position information) indicating the position of a data storage and position information (second position information) indicating the position of a defect information storage that stores defect information of the data storage to identify the second position information associated with the first position information indicating the position of the data storage to/from which data are to be written/read. Specific details will be hereinafter described. Description of parts that are the same as those in the first embodiment described above will not be repeated as appropriate.

Figure 8:
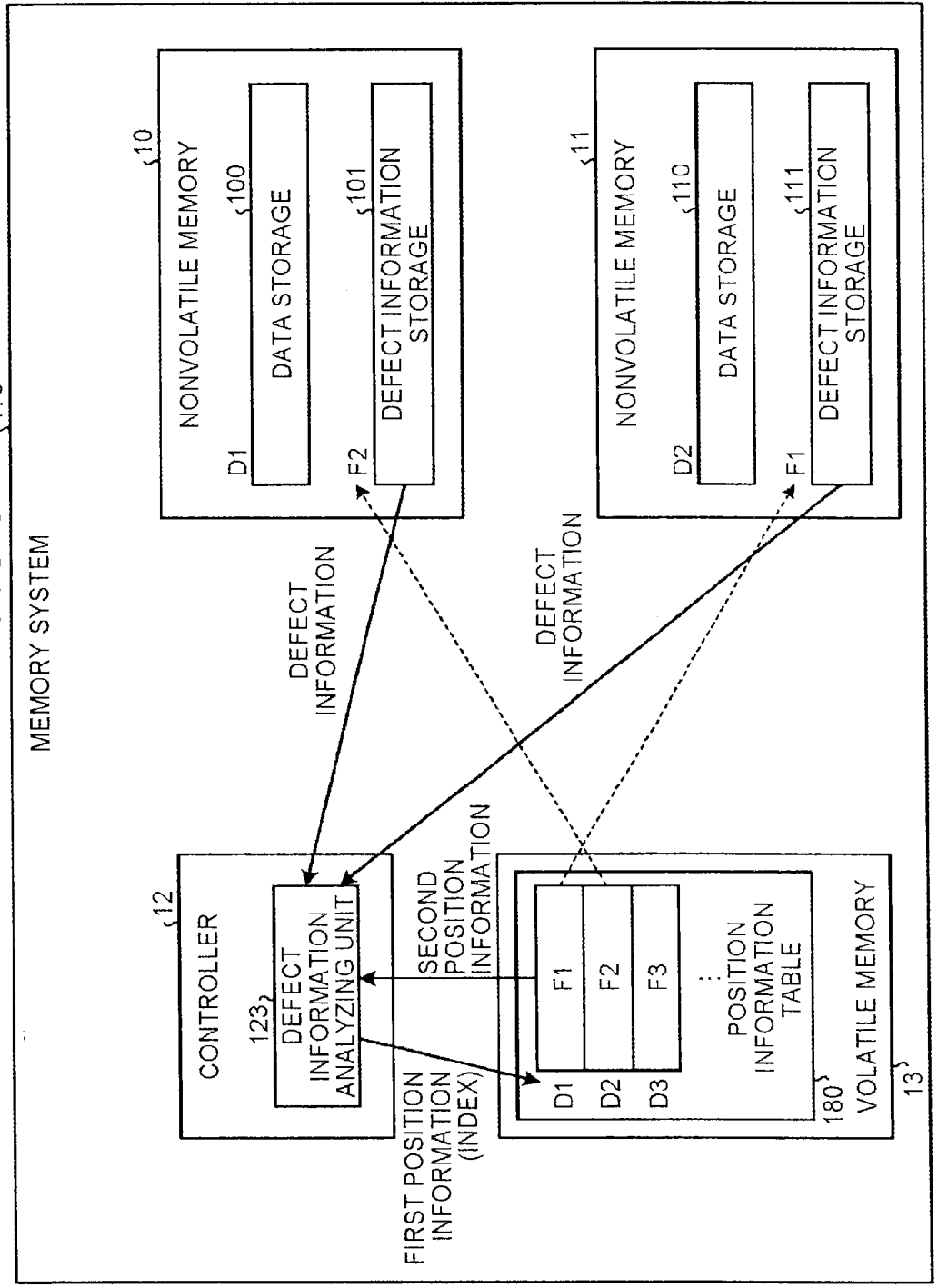
FIG. 8 is a diagram illustrating an exemplary configuration of a memory system according to a third embodiment.

FIG. 8 is a diagram illustrating an exemplary configuration of a memory system 170 according to the third embodiment. As illustrated in FIG. 8, the memory system 170 includes a first nonvolatile memory 10, a second nonvolatile memory 11, a controller 12, and a volatile memory 13.

The volatile memory 13 stores a position information table 180 in which the first position information indicating the position of a data storage and the second position information indicating the position of a defect information storage are associated. In this example, the position information table 180 can be assumed to correspond to "association information" in the claims. In the example of FIG. 8, second position information F1 indicating the position of the defect information storage 111 associated with the data storage 100 is associated with first position information D1 indicating the position of the data storage 100 in the position information table 180. Furthermore, second position information F2 indicating the position of the defect information storage 101 associated with the data storage 110 is associated with first position information D2 indicating the position of the data storage 110.

The defect information analyzing unit 123 refers to the position information table 180 using the position information (first position information) indicating the position of the data storage to/from which data are to be written/read as an index to identify the second position information indicating the position of the associated defect information storage. As a result of adopting the aforementioned configuration, such control as dynamically changing the position of a defect information storage becomes possible. The position in which the volatile memory 13 is arranged may be any position that can be referred to by the defect information analyzing unit 123, and may be outside of the controller 12 as in FIG. 8 or inside of the controller 12. Furthermore, means for implementing the volatile memory 13 is not particularly limited, and the volatile memory 13 may be a DRAM, an SRAM, or the like.

Fourth Embodiment

Next, a fourth embodiment will be described. In the fourth embodiment, a defect information cache that retains (caches) defect information is further provided, and if defect information of the data storage to/from which data are to be written/read is stored in the defect information cache, the defect information analyzing unit reads the defect information from the defect information cache. Specific details will be hereinafter described. Description of parts that are the same as those in the first embodiment described above will not be repeated as appropriate.

Figure 9:
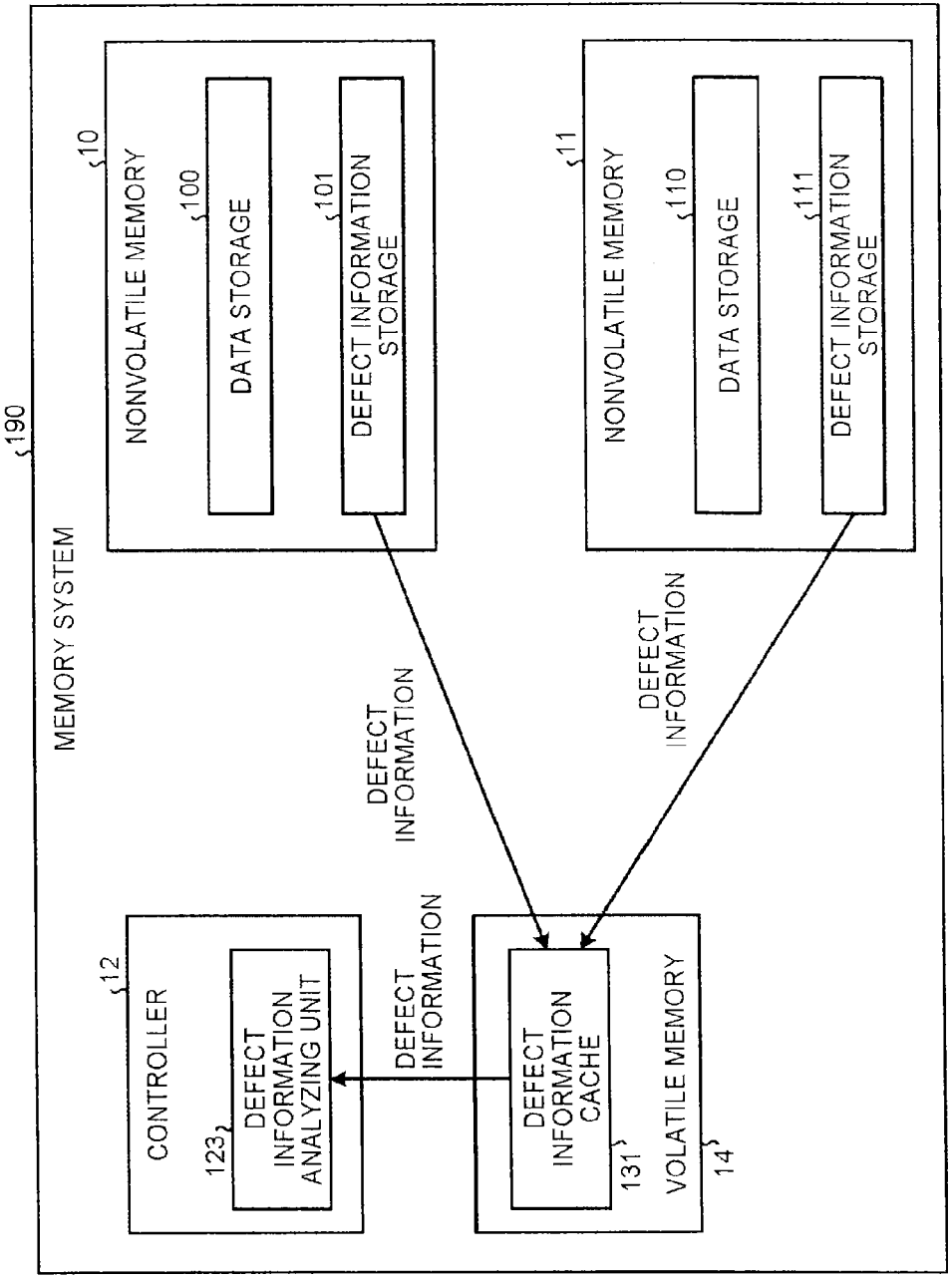
FIG. 9 is a diagram illustrating an exemplary configuration of a memory system according to a fourth embodiment.

FIG. 9 is a diagram illustrating an exemplary configuration of a memory system 190 according to the fourth embodiment. As illustrated in FIG. 9, the memory system 190 includes a first nonvolatile memory 10, a second nonvolatile memory 11, a controller 12, and a volatile memory 14.

The volatile memory 14 includes a defect information cache 131 to cache defect information, and caches defect information stored in the defect information storages 101 and 111 where necessary. Note that the method for implementing a cache algorithm for the defect information cache 131 is not particularly limited. For example, the number of defect information data that are cached at a time and the control method for evicting cached defect information are not limited.

In the example of FIG. 9, the defect information cache 131 retains each position information data (such as an address) indicating the position of a defect information storage in association with defect information stored in the defect information storage identified by the position information. If defect information associated with the position information indicating the position of the defect information storage storing defect information of the data storage to/from which data are to be written/read is present in the defect information cache 131, the defect information analyzing unit 123 can read the defect information from the defect information cache 131, which allows reading of the defect information without accessing to the nonvolatile memories.

Note that control means for reading defect information and storing the defect information into the defect information cache 131 is not particularly limited. The defect information cache 131 may autonomously read defect information from the defect information storages in a case of a cache miss, or the defect information analyzing unit 123 may read defect information from the defect information storages and store the defect information into the defect information cache 131 in a case of a cache miss (whether or not the defect information analyzing unit 123 controls cache hits and misses is not defined).

With such a configuration, defect information that is frequently used (that is, defect information with high temporal locality) and defect information that is highly likely to be referred to next (that is, defect information with high spatial locality) can be cached in the volatile memory 14, which allows reading of defect information more rapidly than reading defect information from a nonvolatile memory (10 or 11).

Figure 10:
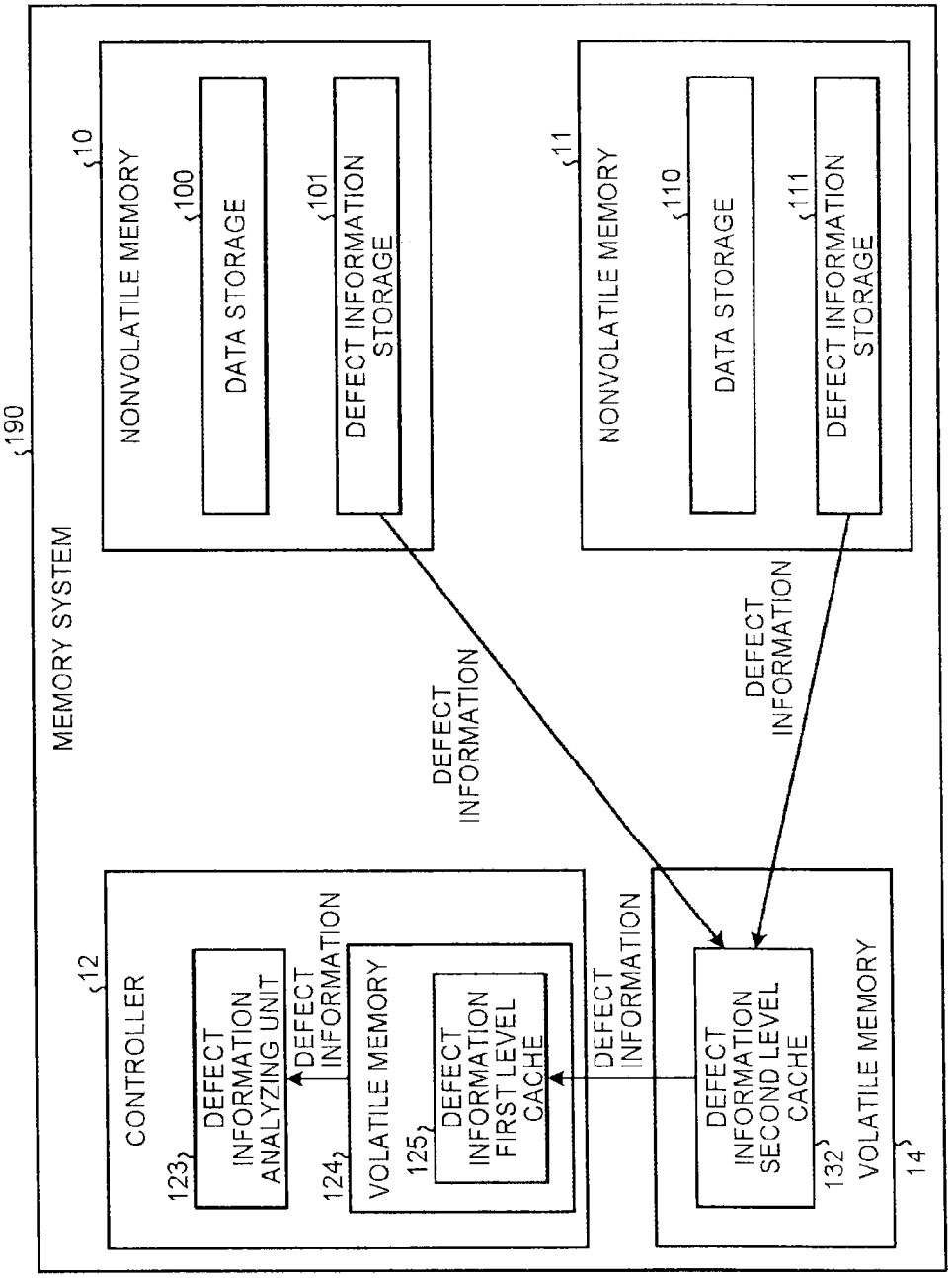
FIG. 10 is a diagram illustrating an exemplary configuration of a memory system according to a modified example of the fourth embodiment.

FIG. 10 is a diagram illustrating a modified example of the memory system 190 according to the fourth embodiment. In the example of FIG. 10, the controller 12 includes a volatile memory 124. In the present modified example, a defect information cache that caches defect information is made hierarchical, the volatile memory 124 includes a defect information first level cache 125, and the volatile memory 14 includes a defect information second level cache 132.

If a cache hit occurs in the defect information first level cache 125, the defect information analyzing unit 123 first reads defect information from the defect information first level cache 125. If a cache hit occurs in the defect information first level cache 125, the defect information analyzing unit 123 refers to the defect information second level cache 132, and if a cache hit occurs in the defect information second level cache 132, the defect information analyzing unit 123 reads defect information from the defect information second level cache 132. If a cache miss occurs in the defect information second level cache 132, the defect information analyzing unit 123 reads defect information from a nonvolatile memory. Note that control means for reading defect information and storing the defect information into the defect information caches is not particularly limited.

Fifth Embodiment

Next, a fifth embodiment will be described. In the fifth embodiment, an external device writes defect information to the nonvolatile memories (10 and 11). Specific details will be hereinafter described. Description of parts that are the same as those in the first embodiment described above will not be repeated as appropriate.

Figure 11:
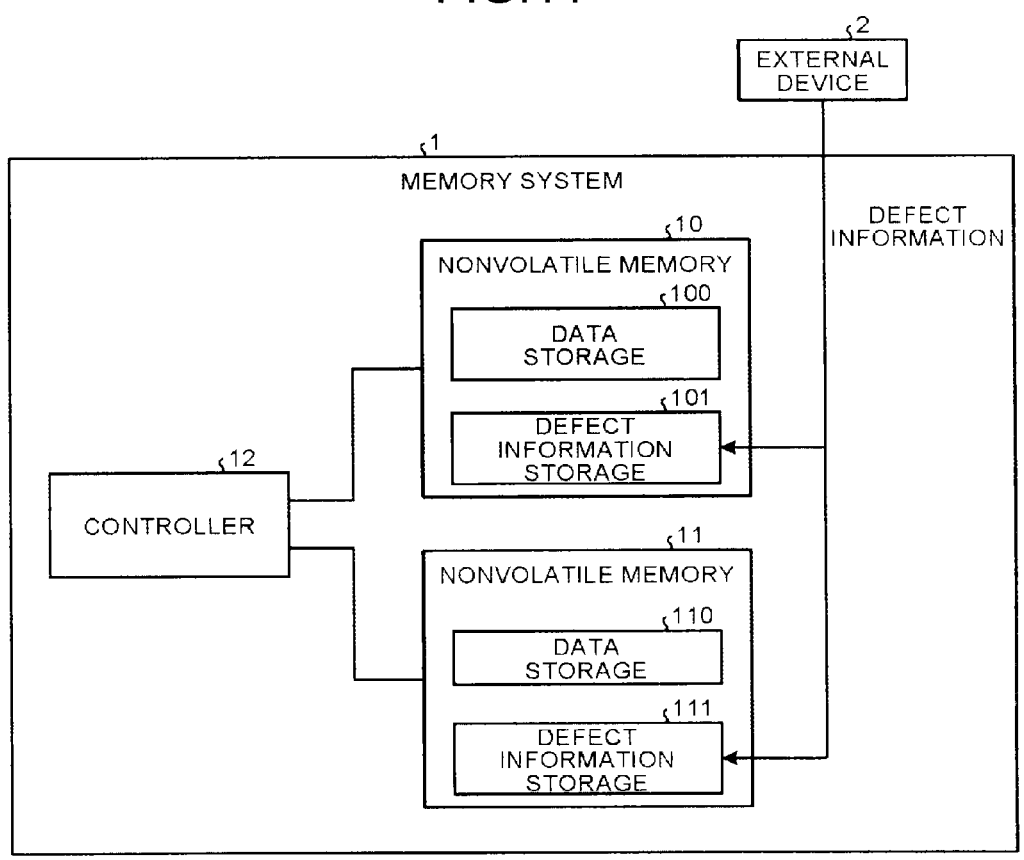
FIG. 11 is a diagram illustrating an exemplary configuration of a memory system according to a fifth embodiment.

As illustrated in FIG. 11, the memory system 1 is connected to an external device 2. The external device 2 can write defect information into each of the first nonvolatile memory 10 and the second nonvolatile memory 11. For example, defects in nonvolatile memories may be inspected in an inspection process in manufacturing and initial defect information generated from the inspection result can be written into the defect information storages from the external device 2.

The external device 2 may be any device having a function of writing defect information into a defect information storage, and may be a combination of a storage device such as a disk storage or a nonvolatile memory device and a driver for writing, or in a form of downloading defect information from a database server for centralized management of defect information via a network.

Sixth Embodiment

Next, a sixth embodiment will be described. In the sixth embodiment, defect information stored in a defect information storage is updated when a defect position in a data storage is newly detected. Specific details will be hereinafter described. Description of parts that are the same as those in the first embodiment described above will not be repeated as appropriate.

Figure 12:
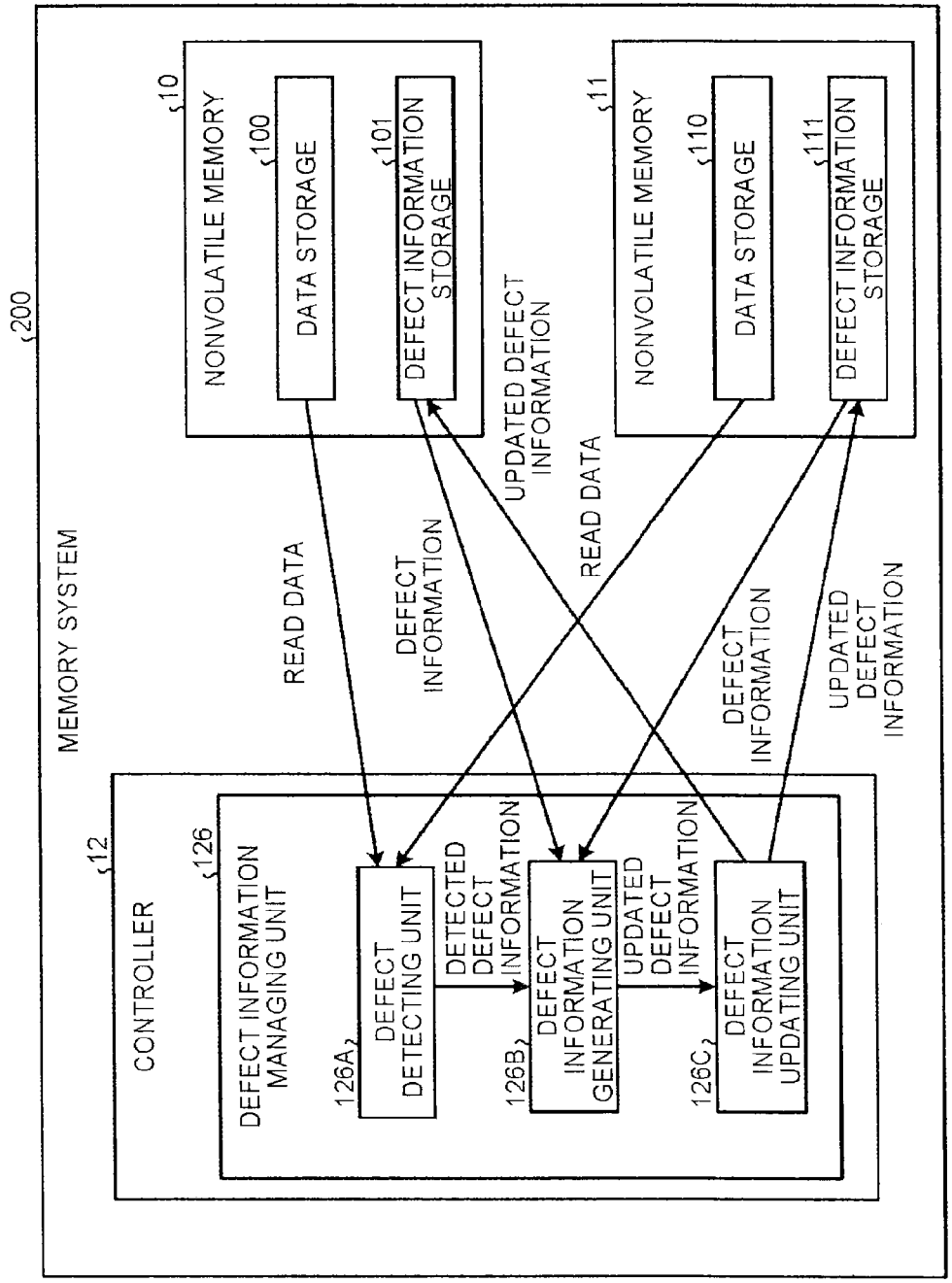
FIG. 12 is a diagram illustrating an exemplary configuration of a memory system according to a sixth embodiment.

FIG. 12 is a diagram illustrating an exemplary configuration of a memory system 200 according to the sixth embodiment. As illustrated in FIG. 12, the controller 12 includes a defect information managing unit 126. The defect information managing unit 126 includes a defect detecting unit 126A, a defect information generating unit 126B, and a defect information updating unit 126C. The defect information managing unit 126 has roles of detecting defects caused after manufacturing a device and updating defect information stored in the defect information storages (101, 111). For convenience of explanation, the write control unit 121 and the read control unit 122 are not illustrated.

The defect detecting unit 126A detects a defect position in a data storage. More specifically, the defect detecting unit 126A detects a defect newly caused after manufacturing a data storage, and means for detecting a defect is not particularly limited. For example, if an error that can be a cause of a defect can be found by a nonvolatile memory, the nonvolatile memory may add information on the found error to read data and provide the information to the defect detecting unit 126A, and a defect may be detected on the basis of the error. Alternatively, an error such as incapability of error correction on read data may be detected as a defect by the defect detecting unit 126A.

The defect information generating unit 126B regenerate defect information to be stored in a defect information storage from defect information read from the defect information storage associated with the data storage (that is, defect information stored in the defect information storage at present) and detected defect information indicating a defect position detected by the defect detecting unit 126A. The defect information updating unit 126C writes the defect information generated by the defect information generating unit 1263 back to the associated defect information storage.

Seventh Embodiment

Next, a seventh embodiment will be described. In the seventh embodiment, a controller includes a data protecting unit that performs error correction on a data storage, and a defect information protecting unit that performs error correction on a defect information storage. The error correction capability of the defect information protecting unit is higher than that of the data protecting unit. Specific details will be hereinafter described. Description of parts that are the same as those in the first embodiment described above will not be repeated as appropriate.

Figure 13:
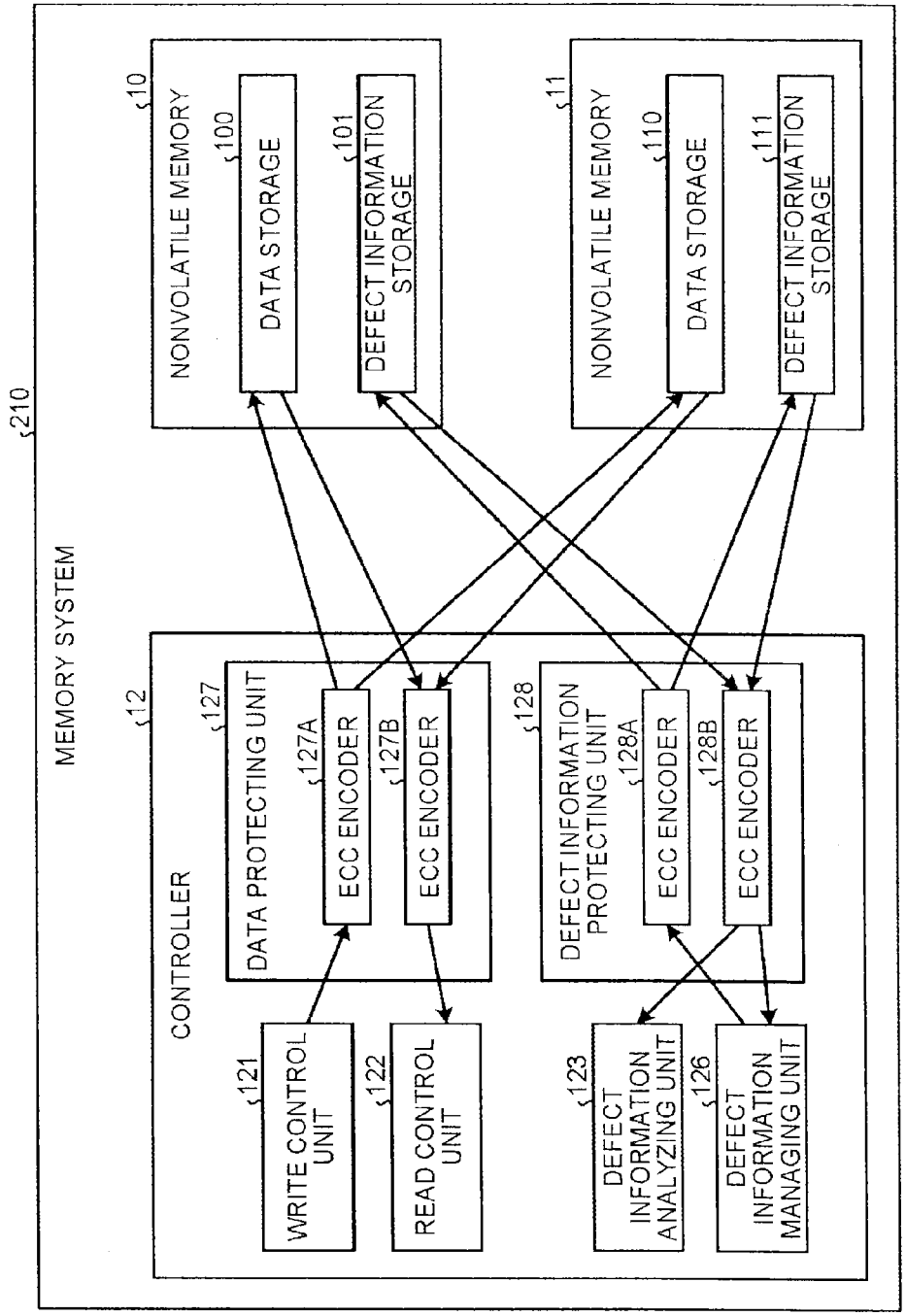
FIG. 13 is a diagram illustrating an exemplary configuration of a memory system according to a seventh embodiment.

FIG. 13 is a diagram illustrating an exemplary configuration of a memory system 210 according to the seventh embodiment. As illustrated in FIG. 13, the controller 12 includes a defect information managing unit 126, a data protecting unit 127, and a defect information protecting unit 128 in addition to the write control unit 121, the read control unit 122, and the defect information analyzing unit 123 described above. The functions of the defect information managing unit 126 are the same as those described in the sixth embodiment. Alternatively, the defect information managing unit 126 may not be provided, for example.

The data protecting unit 127 has a role of performing error correction on a data storage, and includes an ECC encoder 127A and an ECC decoder 127B. The defect information protecting unit 128 has a role of performing error correction on a defect information storage, and includes an ECC encoder 128A and an ECC decoder 128B.

The error correcting system provided by the ECC encoder 127A and the ECC decoder 127B may be any system including error correcting functions required for the memory system 1, and the specific form of the error correcting system is not particularly limited. The ECC encoder 128A generates an error correction code for data to be stored in a data storage, and stores the error correction code in a nonvolatile memory. An error correction code is naturally stored in the same data storage as data associated therewith, but the place where the error correction code is stored is not particularly limited. Thus, an error correction code may be stored in a data storage different from a data storage in which data are to be stored, or a storage dedicated for storing error correction codes may be provided. Alternatively, an error correction code may be stored in a nonvolatile memory different from that including a data storage into which associated data are to be stored.

The error correcting system provided by the ECC encoder 128A and the ECC decoder 128B is preferably a system having higher correction capability than the error correcting system provided by the ECC encoder 127A and the ECC decoder 127B. With such a configuration, erroneous operation due to an error of a defect information storage can be securely prevented.

In a form in which an external device generates and writes an error correction code for defect information to be stored in a defect information storage as in the fifth embodiment described above, for example, the ECC encoder 128A is not needed. In addition, for making the time for reading data and the time for reading defect information overlap with each other, the ECC decoder 128B and the ECC decoder 127B need to be provided separately (independently of each other).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   multiple nonvolatile memories to/from each of which data is written/read independently of one another; and
   a controller configured to control writing of data to and reading of data from the nonvolatile memories, wherein each of the nonvolatile memories includes a data storage and a defect information storage,
the data storage including a normal data storage area for storing the data and a redundant data storage area for writing the data avoiding defect positions in the normal data storage area; and
the defect information storage configured to store defect information indicating information on a defect of the data storage included in another nonvolatile memory different from the present nonvolatile memory.

2. The system according to claim 1, wherein the controller includes:
a read control unit configured to perform control to read the data stored in the data storage from which the data are to be read in receipt of a request for reading the data; and
a defect information analyzing unit configured to read the defect information from the defect information storage associated with the data storage from which the data are to be read, and analyze the defect information to locate a defect position, and
the read control unit performs control to modify the read data on the basis of the defect position located by the defect information analyzing unit.

3. The system according to claim 2, wherein the controller further includes:
a write control unit configured to determine the data storage to which the data are to be written in receipt of a request for writing the data,
the defect information analyzing unit reads the defect information from the defect information storage associated with the data storage to which the data are to be written, and analyzes the defect information to locate a defect position, and
the write control unit controls writing of the data to the data storage avoiding writing of data to the defect position located by the defect information analyzing unit.

4. The system according to claim 3, wherein the defect information analyzing unit identifies second position information indicating a position of the defect information storage associated with the data storage to/from which the data are to be written/read by using a linear expression on first position information indicating a position of the data storage to/from which the data are to be written/read.

5. The system according to claim 3, wherein the defect information analyzing unit refers to association information that is association of first position information indicating a position of the data storage and second position information indicating a position of the defect information storage to identify the second position information associated with the first position information indicating the position of the data storage to/from which the data are to be written/read.

6. The system according to claim 3, further comprising a defect information cache configured to retain the defect information, wherein
when the defect information of the data storage to/from which the data are to be written/read is present in the defect information cache, the defect information analyzing unit reads the defect information from the defect information cache.

7. The system according to claim 1, further comprising:
a defect detector configured to detect a defect position of the data storage;
a defect information generator configured to regenerate the defect information to be stored in the defect information storage associated with the data storage from the defect information read from the defect information storage and the defect position detected by the defect detector; and
a defect information updating unit configured to write the defect information generated by the defect information generator back to the defect information storage.

8. The system according to claim 1, wherein the controller includes:
a data protecting unit configured to perform error correction on the data storage; and
a defect information protecting unit configured to perform error correction on the defect information storage, and
the defect information protecting unit has a higher error correction capability than the data protecting unit.

9. A control method for a memory system including:
multiple nonvolatile memories each including a data storage and a defect information storage, the data storage having a normal data storage area for storing data and a redundant data storage area for writing the data avoiding defect positions in the normal data storage area, and the defect information storage configured to store defect information indicating information on defects in the data storage, the nonvolatile memories allowing writing/reading of data thereto/therefrom independently of one another; and
a controller configured to control writing of data to and reading of data from the nonvolatile memories, the control method comprising:
a read control step of performing control to read the data stored in the data storage from which the data are to be read in receipt of a request for reading the data;
a defect information analyzing step of reading the defect information from the defect information storage included in another nonvolatile memory associated with the data storage of the nonvolatile memory from which the data are to be read, and analyzing the defect information to locate a defect position; and
a modification control step of performing control to modify the data read in the read control step on the basis of the defect position located in the defect information analyzing step.

10. A memory system comprising:
multiple nonvolatile memories to/from each of which data is written/read independently of one another; and
a controller configured to control writing of data to and reading of data from the nonvolatile memories, wherein
each of the nonvolatile memories includes a data storage and a defect information storage,
the data storage including a normal data storage area for storing the data; and
the defect information storage configured to store defect information indicating information on a defect of the data storage included in another nonvolatile memory different from the present nonvolatile memory.

11. A memory system comprising:
a nonvolatile memory having multiple nonvolatile memory planes to/from each of which data is written/read independently of one another; and
a controller configured to control writing of data to and reading of data from the nonvolatile memories, wherein
each of the nonvolatile memories planes includes a data storage and a defect information storage,
the data storage including a normal data storage area for storing the data; and
the defect information storage configured to store defect information indicating information on a defect of the data storage included in another nonvolatile memory plane different from the present nonvolatile memory plane.

* * * * *